United States Patent [19]

Susai

[11] 4,071,641
[45] Jan. 31, 1978

[54] METHOD FOR PROTECTIVE COATING THE INSIDE OF SURFACES OF METAL TUBES BY VAPOR DEPOSITION

[75] Inventor: Sadao Susai, Higashi, Osaka, Japan

[73] Assignee: Daiwa Kogyo Co., Ltd., Osaka, Japan

[21] Appl. No.: 703,150

[22] Filed: July 7, 1976

[30] Foreign Application Priority Data

Sept. 3, 1975 Japan .............................. 50-107388
July 4, 1975 Japan ................................ 50-82914

[51] Int. Cl.$^2$ ............................................. B05D 1/00
[52] U.S. Cl. .................................... 427/234; 118/50; 118/56; 118/408; 118/409; 427/238
[58] Field of Search ............... 427/230, 231, 232, 234, 427/237, 238, 28, 50, 51, 69, 70, 78, 91, 109, 124, 166, 167; 118/48–49.5, 55, 56, 407, 408, 409, 50, 50.1, 1–77; 156/610

[56] References Cited

U.S. PATENT DOCUMENTS

| | | | |
|---|---|---|---|
| 1,747,678 | 2/1930 | Neely et al. | 118/55 |
| 2,121,393 | 6/1938 | Braun | 427/234 |
| 2,880,109 | 3/1959 | Current et al. | 118/55 X |
| 3,219,472 | 11/1965 | Hucks | 427/231 |
| 3,551,188 | 12/1970 | Lindquist | 427/234 |
| 3,974,306 | 8/1976 | Inamura et al. | 427/234 X |

*Primary Examiner*—Morris Kaplan
*Attorney, Agent, or Firm*—Bierman & Bierman

[57] ABSTRACT

A method and an apparatus for lining the interior surface of metal tubing with a protective coating made from either thermoplastic or thermosetting resins. The process is effectuated by the insertion of said resins into the tubing in the form of a knitted or braided mesh, smooth surfaced rods, latticed rods, or rods with perforations; the formation of a vacuum within said tube, and the rotation and heating of the outer surfaces of the tubing.

16 Claims, 7 Drawing Figures

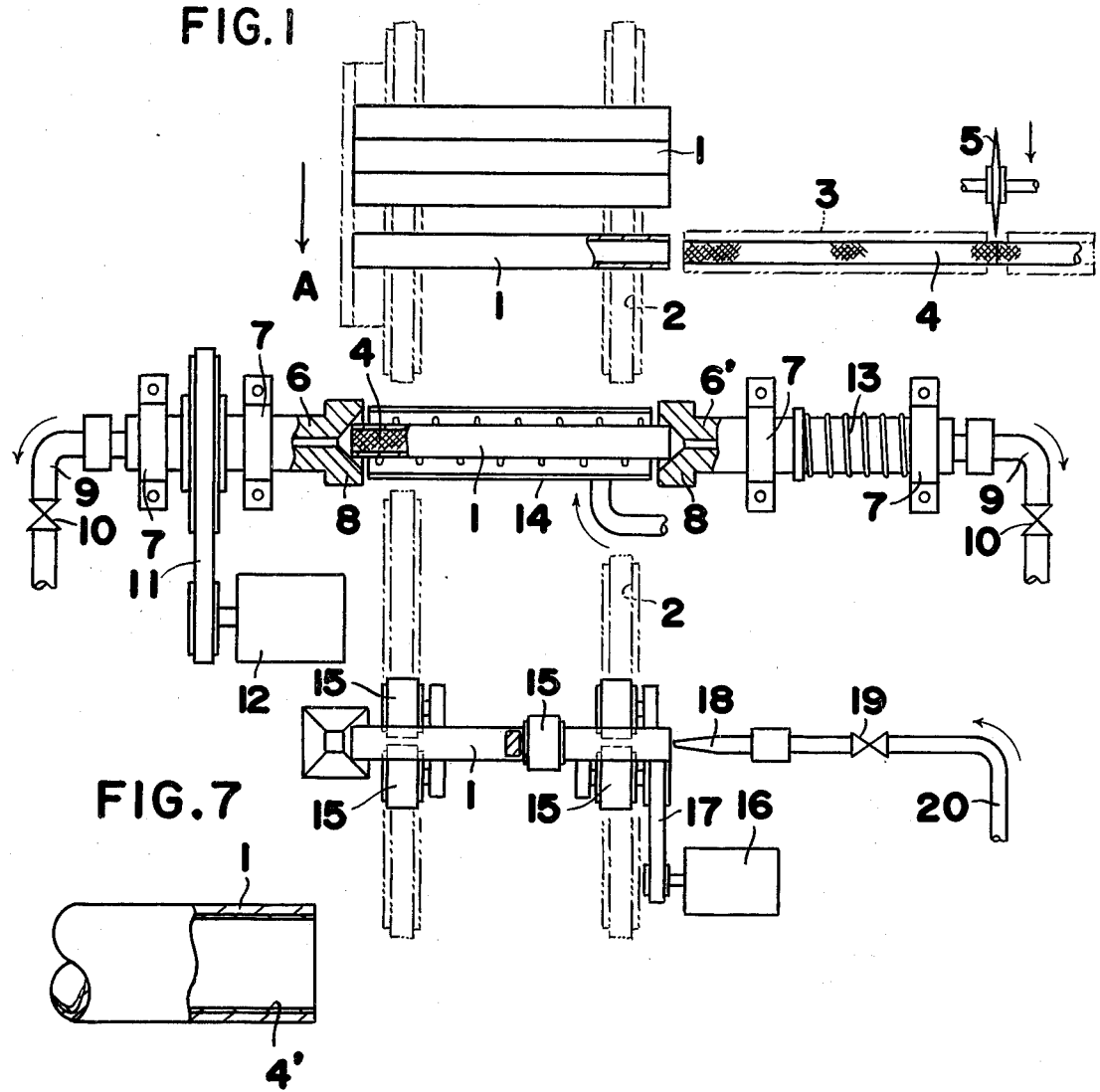

METHOD FOR PROTECTIVE COATING THE INSIDE OF SURFACES OF METAL TUBES BY VAPOR DEPOSITION

This application claims the priority of Japanese Application No. 50-107388 filed Sept. 3, 1975.

The present invention relates to a method used in the smooth, firm and uniform lining of the inside surfaces of tubing made from steel and various other metals with a protective coat made from a synthetic resin which ensures durability and chemical resistance. More particularly, the present invention relates to an improved method in which metal tubes may be lined uniformly along any portion of their inside surfaces. The resulting lining will be free from cracks, pinholes, and other defects. This is accomplished by the use of protective coatings made from thermoplastic resins such as fluorine resin, polyacid resin, polyethylene, polystyrene, acrylic acid resin, polyolefin, polyvinyl chloride, etc.; or from thermosetting resins, for example, phenol resin, urea resin, melamine resin, polyester resin, silicone resin, etc.

In conventional methods, the interior surfaces of the metal tubes are coated with a synthetic resin or thermomeltable material in the form of powders, particles or liquids. These are sprayed or injected into the tubes and melted by heating the exterior surfaces while rotating the tube so that the coating will adhere to the inner walls. Insufficient or uneven attachment of the coating material impossibility of discharging generated gas, and deformation of the powders or particles inevitably causes innumerable microscopic pinholes or cracks in the surface of the thus obtained protective coat. As a result of these defects, the protective coat is easily eroded and exfoliated, and also lacks durability and chemical resistance. This is a disadvantage of the conventional methods and apparatus.

In conventional methods, in order to obtain uniform adherence of the powders, particles and liquids used in forming the protective inner coating, all air inside the tube must be removed so as to form a vacuum. The function of the vacuum is to prevent the deterioration of the resin by oxidation during the heating process. When removing the air from inside the tubing, a large protion of the resin powders, particles, and liquids that were sprayed or injected into the metal tube are sucked out. As a result, very little of the coating material is available to form the protective layer. Furthermore, the vacuum formed inside the tube prevents the introduction of additional coating materials so that it becomes impossible to form a protective coat of substantial and uniform thickness which is durable and chemically resistant.

It is an object of the present invention to overcome the foregoing disadvantages of the conventional methods. The present invention lines the inner surfaces of metal tubes with firm and uniform protective coats, the thickness of which may be varied as desired, and provides glossy surfaces that are free from cracks, pinholes, and other defects.

In practice, thermoplastic or thermosetting synthetic resin is formed into fiber or string form and is intertwined into a knitted or braided cylinder; or it is formed into a smooth-surfaced or latticed rod of circular cross section; or it is formed into a multi-perforated cylindrical body or polygon which has a diameter that will facilitate its rotational movement within the metal tube. This cylinder or rod, made from synthetic resin, is fitted into the precleaned metal tube so as to be parallel with its axis. It is preferred that the resin cylinder or rod should have a volume equal to the overall volume of the intended protective coat. The desired volume may be achieved by the insertion of one or more resin cylinders or rods. When using more than one resin cylinder or rod, they may be separate or joined into a single unit or aggregate units. In addition, they may be suitably spaced by means of connecting resin straps made of the same material as the cylinder or rod so as to be latticed and then rounded into a cylinder. Alternatively, the resin may be formed into a cylindrical body having a suitable number of perforations made on its surface. In any case, it is to be noted that provision should be made to facilitate the escape of gas generated as a result of the melting of the resin within the tube.

Having made allowances for the escape of gas, the foregoing resin cylinder or rod is melted, and uniformly distributed and attached to the inside surface of the metal tube from which all of the air has been removed so as to form a vacuum. The melting is accomplished by heating the outer surface of the tubing while it is rotated at a suitable speed. Thereafter, heating is stopped and rotation of the tube is continued under atmospheric pressure at a suitable speed to slowly cool the attached resin. The result is a tube which is lined with a glossy protective coat which adheres closely to the interior surface of the tube without any exfoliation.

A preferred apparatus to practice the present invention will now be described with reference to the accompanying drawings, in which:

FIG. 1 is a plan view of the apparatus, partly schematic and partly in section;

FIGS. 2 to 6 are fragmentary enlarged perspective views which show the manner in which a cylinder or rod made from resin is used in the metal tube.

FIG. 7 is a fragmentary enlarged longitudinal section of a metal tube with its interior surface lined with a protective coating.

Metal tubes 1 of a predetermined length and diameter have been subjected to chemical conversion treatments, such as degreasing, anticorrosion, neutralization, etc. Tubes 1 are successively and intermittently transferred in the direction of the arrow A by the use of a suitable transferring means 2 such as a belt conveyor. Guiding chute 3 directs resin cylinder 4 into metal tube 1. Cylinder 4 may be composed of resin which has been formed into fiber or string and woven, knitted or braided into a mesh. It may also be formed into a smooth-surfaced or latticed resin cylinder 4. Cutter 5 is used to cut cylinder 4 to a predetermined length. It is desirable that cylinder 4 be formed so that it will have a diameter such that the outer surface will be substantially adjacent to the inner surface of metal tube 1 when cylinder 4 is inserted into tube 1. It is important that cylinder 4 be of a sufficient diameter and rigidity to insure that it can be completely inserted into metal tube 1.

Hollow rotary shafts 6 and 6' are each coaxially supported by bearings 7 adjacent transferring means 2. At the respective inner ends of shafts 6 and 6' are chucks 8 which hold the ends of metal tube 1. The chucks are also connected at their respective outer ends to a vacuum deaerator (not shown) through valves 10 by means of pipes 9. Transmission gear 11 transmits the rotational movement of motor 12 to rotary shaft 6, and the rotational movement of rotary shaft 6 is further transmitted to the other rotary shaft 6' through metal tube 1 supported by means of chucks 8. A suitable number of tube carriers should be provided to support metal tube 1 at intermediate points, especially if the metal tube is long. Rotary shaft 6' is constructed so that it may slide forward, toward, and away from the opposing rotary shaft 6. This is accomplished by means of spring 13 or other pressure means which will increase the tube holding force of chucks 8 and facilitate the rotation of tube 1. The pressure means should also allow rotary shaft 6' to operate so that it is restored to its original position after metal tube 1 is detached therefrom and dropped onto transferring means 2.

Gas burner 14 or other heating means is placed under metal tube 1 which is held in position by means of chucks 8, so that the tube may be rotated to heat the entire circumference thereof as is required. After tube 1 has been heated and detached from chucks 8, it is transferred so it rests on a plurality of rollers 15. Any one of rollers 15 can be rotated at a suitable speed by means of motor 16 and transmission gear 17. The tip of spray nozzle 18 faces the end of metal tube 1 resting upon rollers 15, and is connected to a water source (not shown) through valve 19 by means of water pipe 20.

In operation, when metal tube 1 is placed on transferring means 2, it is transported in the direction of arrow A. It is temporarily stopped alongside guiding chute 3, where resin cylinder 4 is cut to the desired length relative to metal tube 1 by cutting means 5 and is then inserted therein. Tube 1, containing resin cylinder 4, is further advanced by transferring means 2 and is positioned between chucks 8 of rotary shafts 6, 6' by a suitable holding means. At this point, rotary shaft 6' slides forward, aided by pressure means 13 which holds metal tube 1 with an airtight seal between chucks 8 so as to be coaxial with rotary shafts 6, 6'. Thereafter, valves 10 are opened and the deaerator (not shown) is operated to evacuate metal tube 1. While maintaining the vacuum, the metal tube is rotated at a suitable speed by the rotary shafts 6 and 6' which are connected to motor 12 via transmission gear 11, while simultaneously the outer surface of metal tube 1 is gradually heated by heating means 14.

Thus, resin cylinder 4 is melted within the vacuum of the metal tube, and the melted resin is uniformly distributed and transformed into a protective coat that lines the inner surface of the metal tube. In the protective coat thus obtained, there is no possibility that it will deteriorate as a result of oxidation, nor is there any possibility of cracks, pinholes, or other defects which can be caused by the unsatisfactory melting of the resin cylinder or resin rod; or as a result of generated gas remaining between the resin and the inside surface of the metal tube.

After pressure means 13 is returned to its original position and metal tube 1 is released from chucks 8, it is then rotated at a suitable speed by motor 16 while it is being horizontally supported by a plurality of rollers 15. After cylinder 4 has been melted and attached to the inside surface of metal tube 1, the centrifugal force created by the rotation of the metal tube causes the particles of the resin coat to press against each other, resulting in a smooth, dense coating. The centrifugal force also presses the resin against the inside surface of the metal tube, thereby preventing exfoliation and similar defects from appearing in the resin coat. Depending upon the type of resin used, either cold water is sprayed onto the surface of the resin coat by spray nozzle 18 which slowly cools the resin coat, or the coated metal tube is placed into a cooling tank to quench the resin coat. As a result of this cooling process, a completely solidified protective coat is formed which has a dense, smooth and glossy surface of uniform thickness.

The present invention can employ either a thermoplastic resin such as a fluorine resin, polyacid resin, polyethylene, acrylic acid resin, polyolefin, polystyrene, polyvinyl chloride, etc., or a thermosetting resin, such as a phenol resin, urea resin, melamine resin, polyester resin, silicon resin, etc. The advantages of using thermoplastic resin are that it is easily worked, it may be used in a transparent form or may be colored as desired, and any defective moldings or scraps may be easily reused. Its main disadvantage is its sensitivity to heat. Thermosetting resin has excellent hardness as well as strength; however, defective moldings or scraps made from it cannot be reclaimed and it is hard to form an attractive, transparent coat. Thermoplastic resins and thermosetting resins are chosen according to the use to be made of the lined tubes and the fluid to be carried through them. As shown in FIGS. 2 through 4, any of the foregoing kinds of resins can be intertwined, knitted or braided into a mesh cylinder or formed into a smooth-surfaced or latticed rod or cylindrical, circular or polygonal shape having numerous perforations and a suitable diameter. The resin cylinder or rod is inserted into metal tube 1 so as to be parallel with the axis thereof. If metal tube 1 is slowly rotated while being heated, resin cylinder 4 will also be turned along the inside circumference of the tube. As it gradually melts, the resin will disperse and flow uniformly and attach to the inner surface of tube 1, resulting in a lining of uniform thickness.

During the process, the resin cylinder or rod will not be sucked out of the metal tube when deaeration is conducted, and any gas generated by the melting of the resin will not stay between the melted resin and the inner surface or metal tube 1. Consequently, cracks, pinholes, or other defects which can be caused by residual gas are not found in protective coat 4'. Moreover, imperfections which normally result from the uneven melting and attachment of the cylinder or rod-shaped resin are not found; nor is there any deterioration of protective coat 4' brought about by oxidation. Therefore, the present invention allows the economical mass production of metal tubes which have their inner surfaces lined with highly durable and chemically resistant protective coats made from synthetic resins.

Some kinds of resins, particularly fluorine resins, are conventionally considered immpossible or difficult to adhere to metal tubing. In accordance with the present invention, they can very easily and economically be firmly attached to the inner surfaces of metal tubes.

The following examples are illustrative of the present invention.

EXAMPLE 1

A filimentous fluorine resin (trade name "AFLON COP" made by Asahi Glass Co., Ltd.) was intertwined to form a mesh cylinder weighing 85 g and was fitted into a carbon steel straight pipe (specified as SGP in the JIS G3452). The pipe had an outside diameter of 21.7 mm, an inside diameter of 16.1 mm, and was 5 meters long. The inner surface had been previously subjected to a chemical conversion treatment. The steel pipe was then deaerated to reduce its inside pressure and was heated at 300° C for 10 minutes while being rotated at a speed of 200 to 800 rpm. After the heating was stopped, the pipe was further rotated at a speed of 2,000 to 3,000 rpm for 2 minutes to slowly cool it. As a result, the inside surface was lined with a protective coat made from the fluorine resin which was 0.2 mm in thickness.

The protective coat was uniform in thickness and free from breaks in the surface such as pinholes, so that the resulting surface was attractive, smooth and glossy.

EXAMPLE 2

A filamentous polyamide resin (trade name "NYLON 12" made by Daisel Ltd.) was intertwined to form a mesh cylinder weighing 188 g and was fitted into the same kind and size of steel pipe as employed in the Example 1. Thereafter, the steel pipe was deaerated to reduce its internal pressure and heated at 240° C for 10 minutes while being rotated at a speed of 200 to 800 rpm. After the heating was stopped, the steel pipe was further rotated at a speed of 2,000 to 3,000 rpm for one minute and was then quenched. As a result, the inside surface was lined with a protective coat made from polyamide resin which was 0.7 mm in thickness.

This protective coat was uniform in thickness and free from breaks in the surface, such as pinholes, so that the resulting surface was attractive, smooth and glossy.

EXAMPLE 3

Filamentous polyethylene (made by Asahi Dow Ltd.) was intertwined to form a mesh cylinder weighing 167 g and was fitted into the same kind and size of steel pipe as employed in the Example 1. Thereafter, the pipe was deaerated and heated at 220° C for 10 minutes while being rotated at 200 to 800 rpm. As a result of the same subsequent operation as in Example 2, the inside surface was lined with a protective coat made from the polyethylene which was 0.7 mm in thickness.

The protective coat was uniform in thickness and free from breaks in the surface, such as pinholes, so that the resulting surface was attractive, smooth and glossy.

EXAMPLE 4

Six smooth-surfaced straight rods having a diameter of 5 mm and a 5 meter length were made from fluorine resin (trade name "AFLON COP" made by Asahi Glass Co., Ltd.) and were connected into a single unit. These single unit rods were inserted into the same kind and size steel pipe as employed in the Example 1 so as to be parallel with the axis thereof. Thereafter, the steel pipe was deaerated to reduce its inside pressure and was heated at 300° C for 10 minutes while being rotated at a speed of 200 to 800 rpm. After the heating was stopped, the pipe was further rotated at a speed of approximately 3,000 rpm for two minutes to slowly cool it. As a result, the inside surface was lined with a protective coat made from the fluorine resin which had uniform thickness of 1.0 mm.

The protective coat was uniform in thickness and free from breaks in the surface, such as pinholes, so that the resulting surface was attractive, smooth and glossy.

EXAMPLE 5

A smooth-surfaced straight rod having a diameter of 8.0 mm and a length of 5.5 meters made from polyamide resin (trade name "NYLON 12" made by Daisel Ltd.) and was inserted into the same kind and size of steel pipe as employed in the Example 1. Thereafter, the pipe was deaerated and heated at 240° C for 10 minutes while being rotated at a speed of 200 to 800 rpm. The resin rod was turned and melted while being kept parallel with the axis of the steel pipe. When the melted resin had adhered to the entire inside surface of the steel pipe, the heating was stopped and cold water was injected into the steel pipe to quench it while it was rotated at a speed of 3,000 rpm for one minute. As a result, the inside surface was lined with a protective coat which was 1.0 mm thick and free from pinholes, cracks, and other discontinuities. The surface of the protective coat was smooth, glossy and attractive.

EXAMPLE 6

A smooth-surfaced rod having an outer diameter of 16.0 mm, an inner diameter of 15.7 mm and a length of 5.5 meters was made from polyethylene (manufactured by Asahi Dow Ltd.). The rod was provided with a large number of small holes in its inside surface. It was then fitted into the same kind and size of straight steel pipe as used in the Example 1. Thereafter, the pipe was deaerated to reduce its inside pressure and was heated at 220° C for 10 minutes while being rotated at a speed of 200 to 800 rpm. The resin rod was concentrically turned within the steel pipe and melted therein. The melted resin adhered to the entire inside surface of the pipe with the aid of centrifugal force. As a result of the same process as used in Example 2, the inside surface was lined with a protective coat made from polyethylene which was uniform in thickness and had a smooth, glossy and attractive surface.

Although the present invention is illustrated and described in relationship to specific embodiments it is nevertheless not intended to be limited to the details shown. Various modifications and changes, particularly of the structure and shape of synthetic resin inserted into the metal tubes, may be made without departing from the spirit of the invention and the scope and range of equivalents of the appended claims.

What we claim is:

1. A process for lining the inside surfaces of a metal tube with a protective coat which comprises:
    shaping a resin into at least one solid form of a substantially perforated tubular member having a length substantially equal to that of the desired coating, inserting the form into said metal tube, forming a vacuum within said tube, rotating said tube at a first speed while heating it, whereby said resin forms a lining inside said tube, and cooling said tube and said resin.

2. A process according to claim 1 wherein said tube is rotated at a second speed during said cooling.

3. A process according to claim 2 wherein said second speed is substantially greater than said first speed.

4. A process according to claim 1 wherein the resin is thermoplastic.

5. A process according to claim 1 wherein said resin is thermosetting.

6. A process according to claim 1 wherein the resin is formed into filaments and woven into a mesh cylinder.

7. A process according to claim 1 wherein the resin is formed into a latticed rod.

8. A process according to claim 1 wherein the resin is formed into a multiply perforated cylindrical body.

9. A process according to claim 1 wherein the resin is formed into an elongated polygon.

10. A process according to claim 1 wherein said first speed is about 200 to 800 rpm.

11. A process according to claim 2 wherein said second speed is about 2,000 to 3,000 rpm.

12. A process according to claim 2 wherein the metal tube is quenched with water.

13. A process according to claim 1 wherein the resin is formed into a shape which is a mesh cylinder, a latticed rod, a multiply perforated cylinder body, an elongated polygon or a combination thereof.

14. A process as recited in claim 1 wherein said form has a volume equal to that of the desired coat.

15. A process according to claim 4, wherein the thermoplastic resin is selected from the group consisting of fluorine resin, polyacid resin, polyethylene, acrylic acid resin, polystyrene and polyvinyl chloride.

16. A process according to claim 5, wherein the thermosetting resin is selected from the group consisting of phenol resin, urea resin, melamine resin, and silicon resin.

* * * * *